United States Patent [19]

Hori et al.

[11] Patent Number: 4,663,169

[45] Date of Patent: May 5, 1987

[54] METHOD FOR AUTOMATIC MEASUREMENT AND CONTROL IN CURD MAKING PROCESS

[75] Inventors: Tomoshige Hori, Kitamoto; Kensuke Itoh, Kodaira, both of Japan

[73] Assignee: Snow Brand Milk Products Co., Ltd., Japan

[21] Appl. No.: 830,859

[22] Filed: Feb. 19, 1986

[30] Foreign Application Priority Data

Aug. 14, 1985 [JP] Japan ............................. 60-179122

[51] Int. Cl.⁴ .................... A23C 9/13; A01N 33/04
[52] U.S. Cl. ...................................... 426/38; 374/16; 374/103; 426/231
[58] Field of Search .................... 374/101, 141, 103; 99/453, 421 TP; 426/88, 38, 231

[56] References Cited

U.S. PATENT DOCUMENTS

| | | | |
|---|---|---|---|
| 3,690,002 | 9/1972 | Frederick et al. | 99/453 X |
| 3,713,339 | 1/1973 | Medlar | 374/141 X |
| 3,718,721 | 2/1973 | Gould et al. | 374/141 X |
| 4,419,021 | 12/1983 | Terada et al. | 374/101 |
| 4,492,713 | 1/1985 | Chauvin | 426/231 |
| 4,534,982 | 8/1985 | Yoshida et al. | 426/38 X |

Primary Examiner—Daniel M. Yasich
Attorney, Agent, or Firm—Murray and Whisenhunt

[57] ABSTRACT

A method for automatic measurement and control in curd making process is provided wherein an electrical current is supplied to an electrical conductor thermally contactable with milk stored in a curd tank so as to be heated to result in sufficiently higher temperature of the said conductor than the surrounding milk, temperatures or electrical resistances of the electrical conductor are measured in relation to time lapse, an elapsed time starting from the commencement of curdling is measured on the basis of a change in temperature or electrical resistance of the electrical conductor, and the elapsed time is compared with a predetermined curdling progress time ranging from the commencement of curdling to curd cutting so as to automatically judge a curd cutting timing.

1 Claim, 4 Drawing Figures

METHOD FOR AUTOMATIC MEASUREMENT AND CONTROL IN CURD MAKING PROCESS

BACKGROUND OF THE INVENTION

This invention relates to a method for automatic measurement and control in curd making process.

In manufacturing of cheese, a curdling process is employed to add such an additive as rennet to cow's milk, skim milk or reconstituted milk so as to curdle the milk and it is the most important and fundamental process because the curdy state of milk definitely determines quality of cheese products. Conventionally, however, judgment of the curdy state of milk has relied mainly upon subjectivity based on experience of workers, resulting in non-uniform yield and quality of cheese products and poor production efficiency.

Further, in cutting cheese curd, workers have relied upon intuition maturing from their experience to judge an elapsed time starting from the addition of rennet, and the cheese curd has been cut at the thus judged timing, giving rise to non-uniform size of curds.

SUMMARY OF THE INVENTION

An objective of this invention is to provide a method for automatic measurement and control which can eliminate the disadvantages resulting from the judgment by workers of the curdy state of milk and the judgment by workers of the curd cutting timing in the conventional curd making process, so as to improve yield of cheese products, to uniform quality and size of cheese products, and to improve production efficiency.

According to the invention, the above objective can be accomplished by a method for automatic measurement and control wherein an electrical conductor thermally contactable with milk stored in a curd tank is supplied with an electrical current so as to be heated, to result in sufficiently higher temperature of the said conductor than the surrounding milk, temperatures or electrical resistrances of the electrical conductor are measured in relation to time lapse, an elapsed time starting from the commencement of curdling is measured on the basis of a change in temperature or electrical resistance of the electrical conductor, and the elapsed time is compared with a predetermined curdling progress time ranging from the commencement of curdling to curd cutting so as to automatically judge a curd cutting timing.

Thus, the present invention ensures that the elapsed time starting from the commencement of curdling can be measured from changes in temperature or electrical resistance of the electrical conductor heated under the application of electrical current and the thus measured elapsed time can be compared with the predetermined curdling progress time ranging from the commencement of curdling to the curd cutting so as to automatically judge the curd cutting timing, thereby eliminating irregularity in curd cutting timing caused by the subjective judgement by the workers in charge of curd making, and preventing loss due to disposal of the entire amount of raw milk in the tank which must be brought about in the event that artificial errors in operation occur including failure to add rennet and double addition of rennet.

In addition, the method according to the invention also ensures that timings for supply of milk to the curd tank and for whey discharge can be detected on the basis of changes in temperature or electrical resistance of the electrical conductor heated under the application of electrical current, so that the entire curd making process can be fully automated including the automatic judgment of the curd cutting timing, thereby steadily reducing cheese production cost, stabilizing quality and yield of cheese products and reducing irregularity in curd cutting timing.

DESCRIPTION OF THE PREFERRED EMBODIMENT

Figure 1:
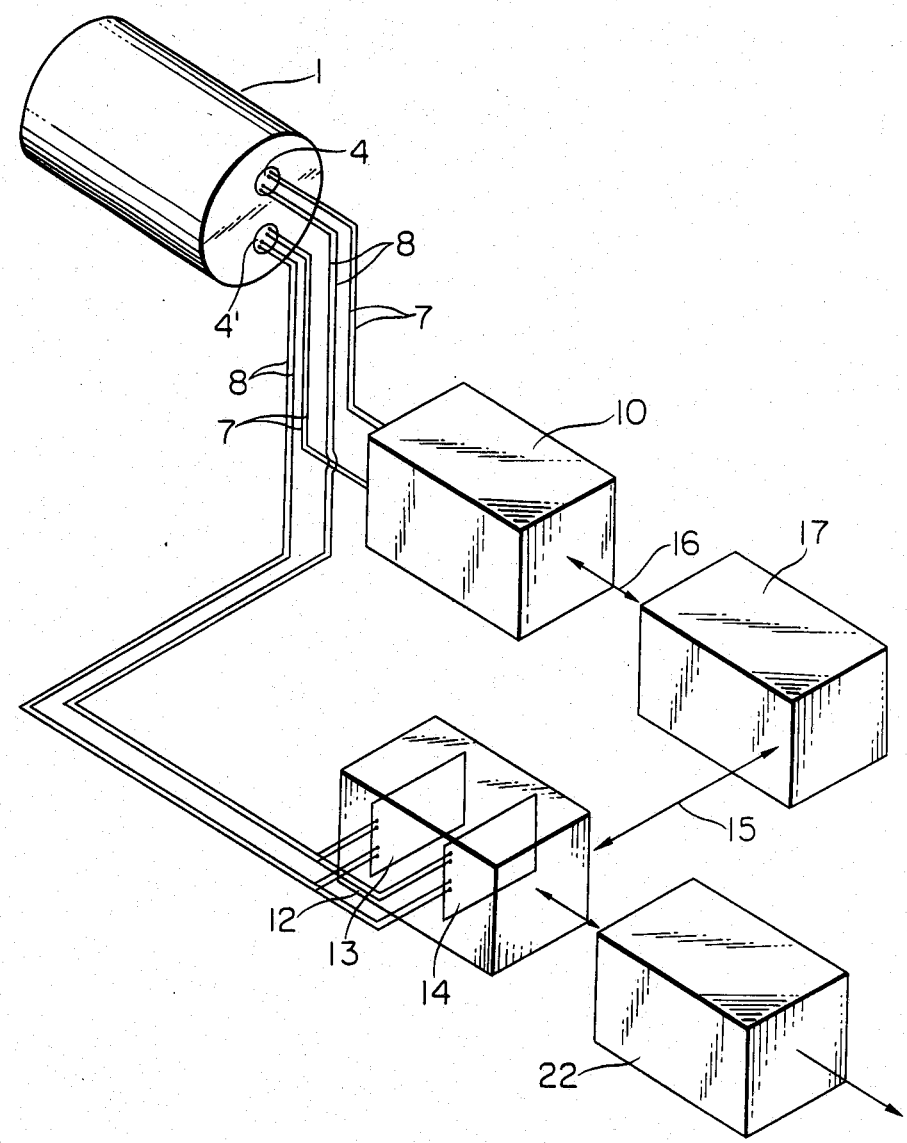
FIG. 1 is a schematic perspective view showing an example of a measuring system used for a method for automatic measurement and control according to the invention.
Figure 2:
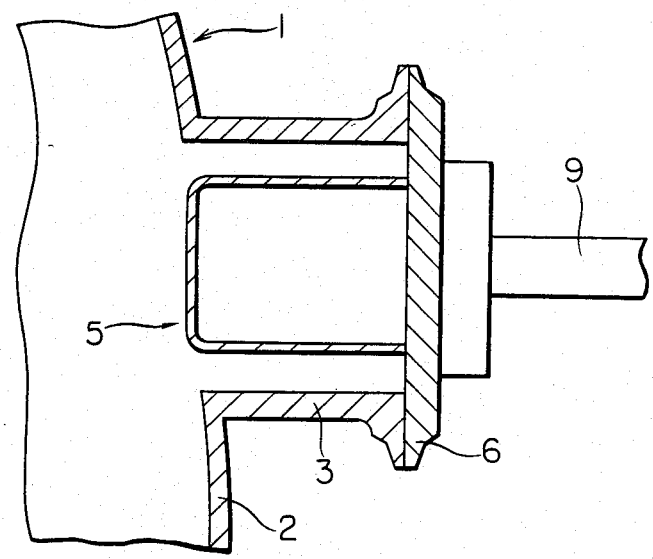
FIG. 2 is a fragmentary sectional front view of a sensor unit of the system shown in FIG. 1.
Figure 3:
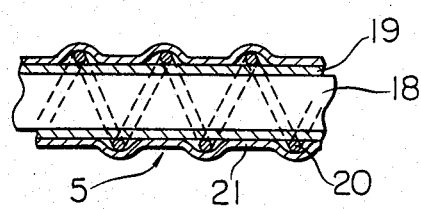
FIG. 3 is a longitudinal sectional front view showing part of a sensor of the sensor unit shown in FIG. 2.

Referring to FIG. 1, there is shown a lateral type cylindrical cheese tank 1 typically having a diameter of 4 m and a capacity of about 20 $m^3$. As shown in FIG. 2, the tank 1 has a side end wall 2 to which whey discharge flanges 3 are mounted at heights corresponding to 12 $m^3$ and 5 $m^3$ levels, respectively, and the respective whey discharge flanges are mounted with flange plates 6 respectively mounted with sensors 5 to constitute sensor units 4 and 4' which are illustrated in FIG. 1. Each of the sensors 5 is connected to a cable 9 consisting of two current lead wires 7 and two voltage lead wires 8. The two current lead wires 7 of each sensor unit connect to an automatic DC power supply 10 which is controlled by a controller 17 comprised of a computer. The two voltage lead wires 8 of each of the sensor units 4 and 4' connect to an A/D converter 13 and a relay card 14 of a data loader (data acquisition controller) 12. An example of the sensor 5 is partly illustrated, in enlarged sectional form, in FIG. 3. As shown, the sensor 5 has a stainless steel rod 18 with a Teflon cover 19, an electrical conductor such as a platinum wire 20 helically wound about the cover 19, and a teflon cover 21 surrounding the platinum wire 20. The data loader 12 and the power supply 10 are connected to the controller 17 through GP-IB cables 15 and 16, respectively. All instructions necessary for measurement and sequence control are issued in accordance with a program pursuant to a standard curd characteristic curve read in the controller 17 and fed to a drive member such as a motor (not shown) via a sequence control system 22.

Figure 4:
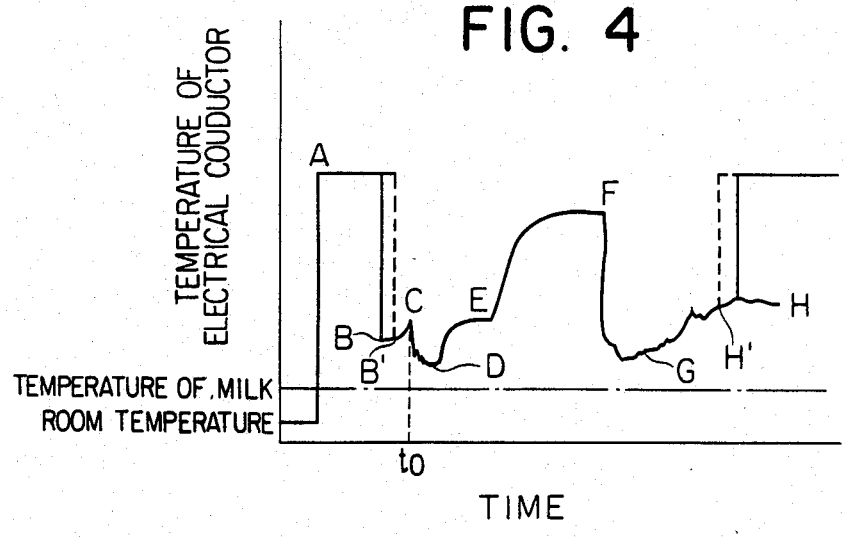
FIG. 4 is a graph showing a curd characteristic.

The standard curd characteristic curve representative of changes in temperature or electrical resistance of the electrical conductor 20 in relation to time lapse is given as shown in FIG. 4. In FIG. 4, B and B' denote temperatures of the electrical conductors when supplying milk, C a conductor temperature when adding rennet, D a conductor temperature at the termination of stirring, E a conductor temperature at the commencement of curdling, F a conductor temperature at the commencement of curd cutting, G changes in conductor temperature when cooking, and H and H' temperatures of conductors when discharging whey.

For automatic control of cheese curd production by controlling the above parameters, the controller 17 first instructs the DC power supply 10 to start supplying a constant DC current to the sensors 5 and the data loader 12 to start measuring voltages.

Measured voltages are sent to the controller 17 so as to be converted into corresponding temperatures or electrical resistances which in turn are used to display a temperature versus time curve or an electrical resistance versus time curve on a cathode ray tube attached to the controller 17. When the commencement of curdling represented by E is detected after completion of supply of milk, a timer included in the controller is actuated for a predetermined time, followed by transmittal of a signal for curd cutting to the sequence control system 22 and consequent actuation of a motor (not shown) for rotating cutting blades.

Finally, whey discharge is detected and measurement results are delivered out to a printer and a magnetic disc, ending an operation.

EXPERIMENTAL EXAMPLE

A stainless steel rod 18 of 2 mm diameter and 5 cm length with a teflon cover 19 of 0.15 mm thickness was prepared. A platinum wire 20 of 0.1 mm diameter was wound about the teflon cover 19 by ten turns per 1 cm length of the stainless steel rod 18. Then, the platinum wire coil was surrounded by a teflon cover 21 of 0.15 mm thickness, thus completing a sensor 5. Two of the thus prepared sensors were fixed to flange plates 6 of 12 cm diameter to provide sensor units 4' and 4 which were respectively located at 50 cm and 30 cm below a scheduled liquid level to which milk supplied onto a cheese vat eventually reaches. A constant DC current of 0.3A was then passed through the platinum wires 20 and as a result, the platinum wires 20 were balanced, in terms of temperature, at about 70° C. when room temperature was 25° C. (point A in FIG. 4).

Subsequnetly, pH-value adjusted raw milk containing an 11.2% solid component and a 2.7% fat component and exhibiting a 6.81 pH-value at a temperature of 31° C. was supplied onto the cheese vat. As soon as the liquid level of the raw milk reached the sensor locations, the platinum wires 20 were balanced at 37° C. (points B and B' in FIG. 4). The temperature B is for the sensor unit 4' and the temperature B' is for the sensor unit 4.

A difference between a time at which the temperature point B was observed and a time at which the temperature point B' was observed was used to calculate a milk supply completed time (to in FIG. 4). The supply of milk was then stopped at the time to, and 0.0035% rennet (produced by Christian Hansen) was added at the temperature point C. The milk mixed with the additive was stirred at the temperature point D for about five minutes and thereafter held stationary.

The commencement of curdling was detected about 20 minutes after the addition of rennet at the temperature point E. When 18 minutes (curdling progress time determined in advance in consideration of quality and yield of cheese products) elapsed from the detection of the temperature E, the conductor temperature reached 42° C. at the temperature point F and the curd was cut.

After the curd cutting, the curds were stirred for cooking for about 10 minutes and discharge of whey was started. When a decreased liquid level resulting from the whey discharge was detected at the temperature points H' and H, a whey discharge completed time was calculated and a curd making process ended.

The temperature H' is for the sensor unit 4 and the temperature H for the sensor unit 4'.

The measurement and detection in this example were fully automatically achieved by using a measuring system shown in FIG. 1 including a controller (HP 9000/216), a data loader (HP 3497 A) and an automatic DC source (HP 6034 A) manufactured by Hewlett Packard.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method for automatic measurement and control in a cheese curd making process comprising the steps of:
    supplying an electrical current to at least one electrical conductor thermally contactable with milk stored in a curd tank so that said conductor is electrially heated to a temperature which is higher than the temperature of the said milk:
    adding a curd producing material to said milk;
    measuring the resulting temperatures or electrical resistances of said electrical conductor in relation to the time lapse so as to detect the commencement of curdling;
    measuring an elapsed time starting from the commencement of curdling on the basis of a change in temperature or electrical resistance of said electrical conductor; and
    comparing the elapsed time with a predetermined curdling progress time ranging from the commencement of curdling to curd cutting so as to automatically judge a curd cutting timing.

* * * * *